Jan. 28, 1936.  P. HETENYI  2,028,775

ELECTRICAL CONDENSER

Filed May 25, 1932

INVENTOR
Paul Hetenyi
BY
Schechter Koth
his ATTORNEYS

Patented Jan. 28, 1936

2,028,775

UNITED STATES PATENT OFFICE 2,028,775

ELECTRICAL CONDENSER

Paul Hetenyi, New York, N. Y., assignor to Solar Manufacturing Corporation, a corporation of New York Application May 25, 1932, Serial No. 613,396

5 Claims. (Cl. 175—315)

This invention relates generally to improvements in the electrolytic type of electrostatic condensers, which substantially consist of two electrodes of thin aluminum foil, on one of which an oxide film is formed for direct current use, or on both for use with alternating current, and in which these electrodes are separated by an electrolyte in paste form and a textile gauze.

It is among the objects of this invention to provide an electrical condenser having an exceptionally efficient electrolyte paste which is so viscous as to maintain its position between the electrodes by its own consistency and adhesion to the electrode plates without the mechanical aid of a carrier medium.

Another object of this invention is to provide an electrical condenser having a textile gauze as a separator between the electrodes for the sole purpose of preventing their contacting with each other and not for the purpose of acting as a carrier medium for the electrolyte paste.

A further object of this invention is to prevent the expansion or separation of the spirally wound electrodes which ordinarily occurs when the condenser heats up when in operation, or which may take place due to many other known causes. This can be effected by two means which may be employed cooperatively or alternatively as will be explained hereafter.

With these and other objects in view, to be more fully set forth hereinafter, the invention consists in the novel construction, combination of elements and arrangements of parts which will be exemplified in operation and construction as set forth in the following specification and illustrated by the accompanying drawing.

The disclosure made the basis of exemplifying the present inventive concept suggests a practical embodiment thereof, but the invention is not restricted to the exact details of this disclosure, and the latter, therefore, is to be understood from an illustrative, rather than a restrictive standpoint.

The invention will first be described in connection with the drawing, wherein similar reference characters are used to designate corresponding parts throughout the several views, and will then be more specifically defined and indicated in the appended claims.

Attention is directed to the drawing in which—

Figure 1:
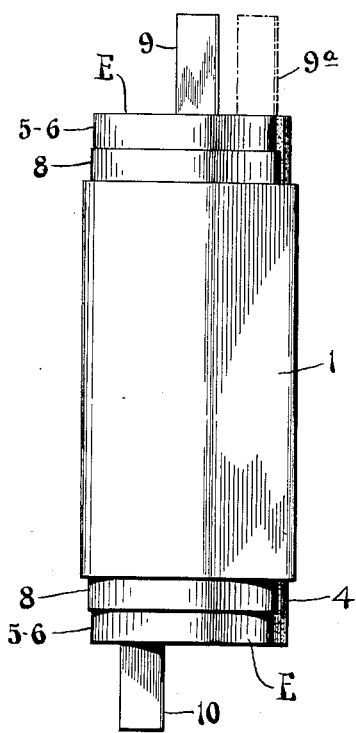
Fig. 1 is a perspective view of my condenser.
Figure 2:
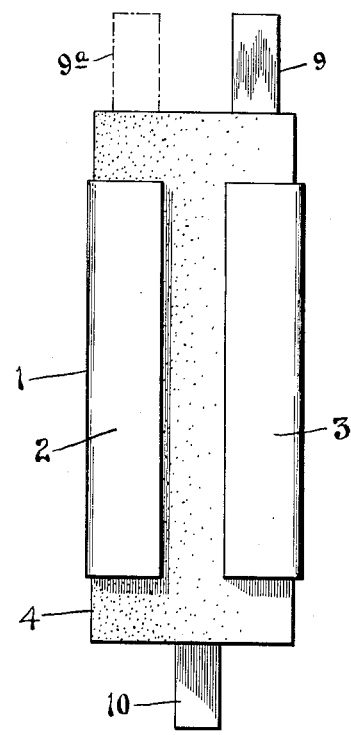
Fig. 2 is a rear view.

Referring to the various figures, numeral 1 is a clamp of sheet steel or any other suitable metal which holds the spirally wound electrode unit E in position. The ends 2 and 3 of the clamp (see Fig. 2) bear against the backing 4 which may be of any suitable insulating material. The electrode unit E is built up of the interposed layers of electrolyte paste 5, textile gauze 6, and the electrodes 7 and 8 as is clearly illustrated in Fig. 4. The electrodes are made from very thin aluminum foil strips. The electrode 7 is the anode and has secured to one of its ends the contact 9; and the electrode 8 is the cathode and it has secured to one of its ends the contact 10. The contact 9ª shown in dot and dash lines in Figs. 1 and 2 is secured to a third foil which is not shown in the drawing, the purpose of which will be fully described hereinafter.

In condensers of this type, it is the custom to use an electrolyte paste which requires a carrier medium to retain it in position between the electrode foils. By experiment I have found an exceptionally efficient electrolyte paste which is so viscous that it maintains its position between the electrode foils by its own consistency and adhesion to the foils without the aid of a carrier medium. Such particular composition of paste is especially efficient in causing superior electrolytic action and long life. This electrolyte paste is preferredly made up of the following ingredients and proportions:—

| | Per cent by weight |
|---|---|
| Glycerine | 36 |
| Ammonium borate | 56 |
| Potato starch | 7 |
| Agar-agar | 1 |

In this mixture the ammonium borate is the active salt, and the glycerine is used as the mixing agent for the salt. At the same time, being a highly hygroscopic substance, it prevents the drying out of the electrolytic paste, thus keeping it in active condition. The potato starch is the coagulating agent which causes high viscosity, and the agar-agar, acting as a glue-like binder, serves both in helping the potato starch to increase the viscosity and also improves the paste as far as prevention of electrolytic current leakage is concerned.

It is understood that for the ingredients mentioned, chemical equivalents in the proper sense, such as borate salts, could be substituted and the use of such substitutes therefor falls within the scope of this invention. For instance; instead of "glycerine" any other hygroscopic and electrolytically inactive solvent could be employed. Instead of ammonium borate any other active inorganic salt, suitable for electrolytic condensers, might be used, for agar-agar other vegetable glues, gum arabic, tragacanth, etc., could be substituted. It is to be observed that neither the hygroscopic nor the coagulating medium, according to their chemical constituency and choice, take an active part in the electrolytic action but merely serve to produce and maintain the desired viscosity.

Figure 4:
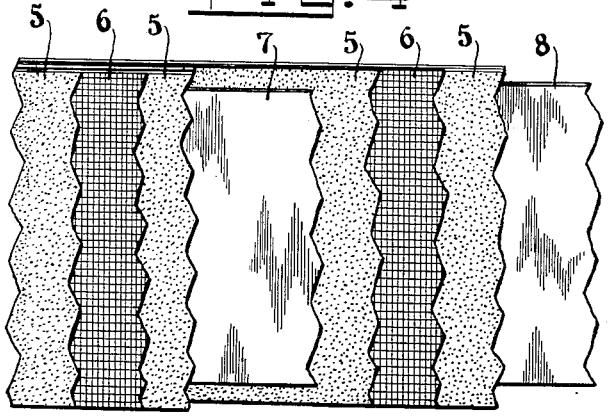
Fig. 4 is a fragmental sectional view of a flattened out electrode unit illustrating how the electrodes are separated from one another by the layers of electrolyte paste and gauze.
Figure 3:
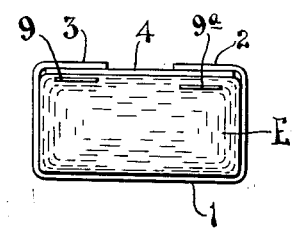
Fig. 3 is a top plan view.

The method of assembling my condenser is to apply a thin coat of electrolyte paste to the gauze strip which is then placed upon the cathode foil 8, or to apply the paste on the cathode and anode foils themselves and then merely place between the adjacent foils a separate gauze. By so applying the paste I do not depend on the textile gauze as the carrier medium. The gauze therefore may be of very wide mesh or merely represent a skeleton frame of strips, just close enough to prevent actual contact of the separate electrode plates. The previously formed anode foil 7 is then placed upon the layer of electrolyte paste and gauze and a second layer of paste and gauze is placed upon it as illustrated in Fig. 4. Forming the anode foil means to coat one of its surfaces with an oxide film in an electrolytic bath, thus forming a dielectric layer with a possible leakage loss of very low value. Having interposed the electrode foils with the layers of paste and gauze, they are then tightly folded or wound in a spiral formation, first in a cylindrical form of a diameter somewhat at less than the width between the lateral legs of the clamp (see Fig. 3) and then forcefully compressed into the rectangular section, shown inside the clamp 1, while the overlapping ends are simultaneously pressed down upon the backing 4, thus exerting a perfect contact between the foils and preventing a separation of the different layers under the expanding influence of heating up under current action. The folding is done from the ends of the electrode foils opposite those upon which the contacts 9 and 10 are secured; these contacts having been secured in position before the foils were interposed with the paste and gauze. With the electrode unit folded, a substantial non-conductive backing 4 is placed in position and the steel clamp 1 is then pressed around them as described. This steel clamp is of great importance to the operation and life of the condenser, as it prevents expansion or separation of the spirally folded electrode foils and the electrolyte paste. Any expansion or separation of these elements would cause imperfect contact between them and the power factor of the condenser would be greatly increased, i. e. become greater than the intended capacity. The keeping of the power factor constant and low is however important, especially when using the condensers on A. C. current or in radio circuits, having high A. C. ripples. Thus the third object listed of the invention is attained, and this object can be furthermore secured by the auxiliary means of dipping the unit into wax of a positive temperature coefficient which would help to bind the unit together and fill up any air spaces, and prevent expansion of the condenser section. Most kinds of waxes of comparatively high melting points would fill this condition, like bee's wax or some vegetable waxes, like carnauba, or Chinese wax (from Fraxinus chinensis). This latter means however is optional and alternative and may be used advantageously with or without the help of a binding clamp.

In the construction of a direct current condenser of the type illustrated, I found it to be of distinct advantage to use an anode foil which is a little narrower than the cathode foil. The purpose of this is to prevent corrosion which might occur on the anode foil; that is, the formed one, should its edges extend beyond those of the cathode foil. This construction feature also serves to prevent the occurrence of long current leakage paths from the anode over the dielectric paste to the cathode, which would result in an altered power factor.

While the foregoing construction of the electrodes achieves the desired results for direct current condensers in which only one of the electrodes is formed, this construction would not be effective for the alternating current type of condenser where two electrodes are to be formed. For the use of alternating current an unformed cathode foil is interposed between two formed anode foils. The edges of this cathode foil extend longitudinaly above and below the anode foils as well as at the ends. The second anode foil introduced for this type of condenser will have the contact 9a secured to it, and it will also be understood that all three electrodes will have a layer of electrolyte paste and gauze interposed between them. This construction feature of the electrodes also serves the same purpose of preventing current leakage between the formed electrodes and the electrolyte paste which greatly improves the power factor of the condenser. The steel clamp heretofore described is particularly useful in the A. C. construction.

In accordance with the provisions of the patent statute, I have described my invention, but I desirt it understood that it is not confined to the particular form shown and described, the same being merely illustrative, and that the invention can be carried out in other ways without departing from the spirt of my invention, and therefore, I claim broadly the right to employ all equivalent instrumentalities coming within the scope of the appended claims, and by means of which, objects of my invention are attained and new results accomplished, as it is obvious that the particular embodiments herein shown and described are only some of many that can be employed to attain these objects and accomplish these results.

Having now described my invention, what I claim and desire to secure by Letters Patent, is:

1. In an electrolytic condenser, a film-forming electrolytic paste of high viscosity, said paste comprising the following ingredients:

| | Per cent by weight |
|---|---|
| Glycerine | 36 |
| Ammonium borate | 56 |
| Potato starch | 7 |
| Agar-agar | 1 |

2. In an electrolytic condenser, an electrolytic paste of such viscosity that it is self-sustaining, when inserted between the electrode plates, said paste comprising a borate salt, such as ammonium borate or sodium borate in sufficient percentage to be film-forming on the anode plate, a hygroscopic fluid vehiculum for the salt, such as glycerine, in sufficient percentage to prevent dehydration of the electrolyte, an inert coagulating agent, such as starch, and a small percentage of a vegetable glue, such as agar-agar, to act as binder and to minimize current leakage.

3. In an electrolytic condenser, the combination with a set of spaced foils of opposite polarity, spirally wound into a cylinder with a film-forming electrolytic agent, suspended in a paste of high viscosity between them; of an integral metal clamp of substantially channel-like form, adapted to compress said cylinder into rectangular shape, when forced around it and when the edges of the channel legs are sharply folded inwardly against it, thus condensing said plates into closer contact and preventing their separation by heat expansion, when condenser is under current action.

4. In an electrolytic condenser, the combination with a set of spaced foils of opposite polarity, originally spirally wound into a cylinder, with a film-forming electrolytic agent, suspended in a paste of high viscosity between them; of means to increase their mutual contact and to prevent their separation by heat expansion when under current action, said means comprising an integral metal plate, adapted to be bent into substantially rectangular form, to compress the cylinder into corresponding rectangular prismatic shape, when forced by suitable means around it, and a layer of wax of a positive temperature coefficient into which the finished condenser is dipped.

5. In an electrolytic condenser, the combination with a set of spaced foils of opposite polarity, originally spirally wound into a cylinder, with a film-forming electrolytic agent, suspended in a paste of high viscosity between them; of means to increase their mutual contact and to prevent their separation by heat expansion when under current action, said means comprising a flat substantial plate of nonconductive material, serving as a backing, and a metal plate, adapted to be bent into substantially rectangular form, to compress the cylinder into corresponding rectangular prismatic shape, when placed on the side opposite to the backing and forced by suitable molding means around the cylinder, with the outer edges sharply folded down upon the backing, and a layer of wax surrounding the finished condenser.

PAUL HETENYI.